US012638575B2

(12) United States Patent
Graham et al.

(10) Patent No.: US 12,638,575 B2
(45) Date of Patent: \*May 26, 2026

(54) SYSTEMS AND METHODS FOR NONINVASIVE DETECTION OF IMPERMISSIBLE OBJECTS USING PERSONAL EQUIPMENT

(71) Applicant: Lassen Peak, Inc., North Bend, WA (US)

(72) Inventors: Hatch Graham, North Bend, WA (US); Ehsan Afshari, Ann Arbor, MI (US); Karl Triebes, Kirkland, WA (US); Ryan Kearny, Kirkland, WA (US)

(73) Assignee: Lassen Peak, Inc., North bend, WA (US)

( \* ) Notice: Subject to any disclaimer, the term of this patent is extended or adjusted under 35 U.S.C. 154(b) by 150 days.

This patent is subject to a terminal disclaimer.

(21) Appl. No.: 18/116,546

(22) Filed: Mar. 2, 2023

(65) Prior Publication Data

US 2023/0204757 A1      Jun. 29, 2023

Related U.S. Application Data

(63) Continuation-in-part of application No. 17/874,638, filed on Jul. 27, 2022, now Pat. No. 12,613,330, (Continued)

(51) Int. Cl.
*G01S 13/88* (2006.01)
*G01S 7/02* (2006.01)
(Continued)

(52) U.S. Cl.
CPC ............ *G01S 13/887* (2013.01); *G01S 7/027* (2021.05); *G01S 7/032* (2013.01); *G01S 7/35* (2013.01);
(Continued)

(58) Field of Classification Search
CPC ........ G01S 13/887; G01S 7/027; G01S 13/89; G01S 2013/0245; G01S 13/426; G01S 7/032; G01S 7/35
See application file for complete search history.

(56) References Cited

U.S. PATENT DOCUMENTS 6,359,582 B1    3/2002  Macaleese
7,209,035 B2    4/2007  Tabankin
(Continued)

FOREIGN PATENT DOCUMENTS

CA          2841179         1/2013
WO    WO 2007086916 A2      2/2007
(Continued)

OTHER PUBLICATIONS

K. Statnikov, J. Grzyb, N. Sarmah, B. Heinemann and U. R. Pfeiffer, "A lens-coupled 210-270 GHz circularly polarized FMCW radar transceiver module in SiGe technology," 2015 European Microwave Conference (Eu MC), Paris, France, 2015, pp. 550-553, doi: 10.1109/EuMC.2015.7345822. (Year: 2015).
(Continued)

*Primary Examiner* — Matthew M Barker

(57)          ABSTRACT

A system comprises a personal device such as one used by law enforcement, and a housing containing a portable radar system with both a ranging resolution and lateral resolution sufficient to detect an object concealed on a person (e.g., one that operates in the THz range), where the housing is configured to be mounted in contact with the personal device such that when mounted, the combined handheld device and housing have a form factor that allows it to retain its characteristic as a personal device, and where the portable radar system is configured to, when in operation, emit a radar beam and to receive a reflection of the emitted radar beam.

18 Claims, 11 Drawing Sheets

Related U.S. Application Data which is a continuation-in-part of application No. 17/243,563, filed on Apr. 28, 2021, now Pat. No. 12,405,367.

(60) Provisional application No. 63/318,907, filed on Mar. 11, 2022, provisional application No. 63/288,942, filed on Dec. 13, 2021.

(51) Int. Cl.

| | |
|---|---|
| *G01S 7/03* | (2006.01) |
| *G01S 7/35* | (2006.01) |
| *G01S 13/89* | (2006.01) |
| *G01S 13/02* | (2006.01) |

(52) U.S. Cl.

CPC ....... *G01S 13/89* (2013.01); *G01S 2013/0245* (2013.01)

(56) References Cited

U.S. PATENT DOCUMENTS

| | | | |
|---|---|---|---|
| 7,920,088 | B2 | 4/2011 | Thompson |
| 7,973,704 | B2 | 7/2011 | Storz |
| 8,253,619 | B2 | 8/2012 | Holbrook |
| 8,472,884 | B2 | 6/2013 | Ginsburg |
| 8,547,274 | B2 | 10/2013 | Reinpoldt, III |
| 9,029,778 | B1 | 5/2015 | Boyd |
| 9,223,018 | B2 | 12/2015 | Dayi |
| 9,316,732 | B1 | 4/2016 | Mohamadi |
| 9,562,969 | B2 | 2/2017 | Wang |
| 9,575,172 | B2 | 2/2017 | Charpentier |
| 10,175,018 | B1 | 1/2019 | Campagna et al. |
| 10,247,809 | B2 | 4/2019 | Testar et al. |
| 10,754,027 | B2 | 8/2020 | Dayi |
| 10,948,587 | B1 | 3/2021 | Boronse |
| 11,550,028 | B2 | 1/2023 | Melzer et al. |
| 11,598,866 | B2 | 3/2023 | Sleasman |
| 11,607,151 | B2 | 3/2023 | Yarkoni |
| 2003/0162521 | A1 | 8/2003 | Vorenkamp |
| 2004/0090359 | A1 | 5/2004 | Mcmakin |
| 2006/0017605 | A1 | 1/2006 | Lovberg |
| 2008/0129581 | A1 | 6/2008 | Douglass |
| 2008/0304044 | A1 | 12/2008 | Cooper et al. |
| 2009/0040308 | A1 | 2/2009 | Temovskiy et al. |
| 2009/0184889 | A1 | 7/2009 | Kier |
| 2010/0090886 | A1 | 4/2010 | Beasley |
| 2010/0117885 | A1 | 5/2010 | Holbrook |
| 2010/0214150 | A1 | 8/2010 | Lovberg |
| 2011/0181300 | A1 | 7/2011 | Bowring |
| 2011/0304498 | A1 | 12/2011 | Yanagihara et al. |
| 2012/0075477 | A1 | 3/2012 | Daly |
| 2012/0081544 | A1 | 4/2012 | Wee |
| 2012/0293355 | A1 | 11/2012 | Marianer et al. |
| 2013/0015977 | A1 | 1/2013 | Scott |
| 2013/0033574 | A1 | 2/2013 | Kuznetsov |
| 2013/0201080 | A1* | 8/2013 | Evans ................ G02B 26/0833 345/8 |
| 2013/0201081 | A1* | 8/2013 | Evans ................ G02B 27/017 345/8 |
| 2013/0207830 | A1 | 8/2013 | Watts et al. |
| 2014/0144009 | A1 | 5/2014 | Chattopadhyay |
| 2015/0085133 | A1 | 3/2015 | Teich et al. |
| 2015/0185314 | A1 | 7/2015 | Corcos et al. |
| 2015/0285907 | A1 | 10/2015 | Mohamadi |
| 2015/0293221 | A1 | 10/2015 | Ahmed |
| 2016/0116581 | A1 | 4/2016 | Mohamadi |
| 2016/0139258 | A1 | 5/2016 | Vellas |
| 2016/0223669 | A1 | 8/2016 | Assefzadeh |
| 2016/0291148 | A1 | 10/2016 | Ellenbogen |
| 2017/0031004 | A1 | 2/2017 | Jales |
| 2017/0038467 | A1 | 2/2017 | Levita |
| 2017/0212059 | A1 | 7/2017 | Charvat et al. |
| 2018/0217249 | A1 | 8/2018 | La Salla et al. |
| 2019/0074569 | A1* | 3/2019 | Kamo .................... H01P 5/222 |
| 2019/0293833 | A1 | 9/2019 | Chen |
| 2020/0064966 | A1 | 2/2020 | Giusti et al. |
| 2020/0064996 | A1 | 2/2020 | Giusti |
| 2020/0109926 | A1 | 4/2020 | Mata |
| 2020/0217948 | A1* | 7/2020 | Wang .................. G01S 13/582 |
| 2020/0311899 | A1 | 10/2020 | Piette |
| 2020/0326416 | A1 | 10/2020 | Albasha et al. |
| 2020/0341493 | A1 | 10/2020 | Sabato |
| 2020/0389624 | A1 | 12/2020 | Oberholzer |
| 2020/0408899 | A1 | 12/2020 | Nanzer |
| 2021/0018595 | A1 | 1/2021 | Mcfadden |
| 2021/0255312 | A1* | 8/2021 | Inanlou .................. G01S 13/86 |
| 2021/0278526 | A1 | 9/2021 | Pedross-Engel |
| 2021/0405179 | A1 | 12/2021 | Graham et al. |
| 2021/0405182 | A1 | 12/2021 | Reynolds |
| 2022/0066065 | A1 | 3/2022 | Zhao |
| 2022/0179062 | A1 | 6/2022 | Amir |
| 2022/0221576 | A1 | 7/2022 | Zhao |
| 2022/0357123 | A1 | 11/2022 | Prudent |
| 2022/0365205 | A1 | 11/2022 | Gal |
| 2022/0390590 | A1 | 12/2022 | Marchese |

FOREIGN PATENT DOCUMENTS

| | | |
|---|---|---|
| WO | WO 2009067627 A1 | 5/2009 |
| WO | WO 2009131806 A1 | 10/2009 |
| WO | WO2018169517 A1 | 9/2018 |
| WO | WO-2020236761 A2 | 11/2020 |

OTHER PUBLICATIONS

J. Grzyb, K. Statnikov, N. Sarmah, B. Heinemann and U. R. Pfeiffer, "A 210-270-GHz Circularly Polarized FMCW Radar With a Single-Lens-Coupled SiGe HBT Chip," in IEEE Transactions on Terahertz Science and Technology, vol. 6, No. 6, pp. 771-783, Nov. 2016, doi: 10.1109/TTHZ.2016.2602539. (Year: 2016).

P. Hillger, J. Grzyb, R. Jain and U. R. Pfeiffer, "Terahertz Imaging and Sensing Applications With Silicon-Based Technologies," in IEEE Transactions on Terahertz Science and Technology, vol. 9, No. 1, pp. 1-19, Jan. 2019, doi: 10.1109/TTHZ.2018.2884852. (Year: 2019).

A. J. Seeds et al., "Coherent terahertz systems," 2012 IEEE International Topical Meeting on Microwave Photonics, Noordwijk, Netherlands, 2012, pp. 278-281, doi: 10.1109/MWP.2012.6474112.

"IEEE Standard for Radar Definitions," p. 42 in IEEE Std 686-2017 (Revision of IEEE Std 686-2008) Sep. 13, 2017, doi: 10.1109/IEEESTD.s017.8048479 (Year: 2017).

Heydari Payam: "Invited Integrated millimeter-wave/terahertz sensor systems for near-field IoT," 2016 53nd ACM/EDAC/IEEE Design Automation Conference (DAC), IEEE, Jun. 5, 2016 (Jun. 5, 2016).

\* cited by examiner

116

Major
Program
Code

Fastpath
VHDL & C

Control Plane
Python / C

Tensorflow
Lite

Petalinux

110

User
Controls

Buttons 111

LEDs 115

Mic & Speaker 113

Camera 112

Display Panel 114

105

Systems &
Communications

Wireless
Communication 106

Battery 108

107

Electrical Connection
109

101

300 GHz Coherent Radar System on Chip

Core
Processing
System on
Chip

Processor 103

Custom Logic 104

102

SYSTEMS AND METHODS FOR NONINVASIVE DETECTION OF IMPERMISSIBLE OBJECTS USING PERSONAL EQUIPMENT

CROSS REFERENCE TO RELATED APPLICATIONS

This application claims priority to U.S. Provisional Patent Application No. 63/318,907, filed on Mar. 11, 2022, and entitled "Systems and Methods for Noninvasive Detection of Impermissible Objects," the contents of which are hereby incorporated by reference in their entirety. This application further claims priority to, and is a continuation in part of, U.S. patent application Ser. No. 17/874,638, filed on Jul. 27, 2022 and titled "Systems and Methods for Using a Conducted Energy Weapon in Conjunction with a Noninvasive Detection of Impermissible Objects," and also to U.S. Provisional Patent Application No. 63/288,942, filed on Dec. 13, 2021 and titled "Systems and Methods for Using a Conducted Energy Weapon in Conjunction with a Noninvasive Detection of Impermissible Objects." This application further claims priority to, and is a continuation in part of, U.S. patent application Ser. No. 17/243,563, filed on Apr. 28, 2021 and titled "Systems and Methods for Noninvasive Detection of Impermissible Objects," and U.S. Provisional Patent Application No. 63/821,701, filed on Jun. 25, 2020, and titled "Systems and Methods for Noninvasive Detection of Impermissible Objects." The contents of each of the applications listed in this paragraph hereby incorporated by reference in their entirety into the present application.

BACKGROUND

Over time, a variety of handheld or body worn personal equipment are increasingly used by law enforcement officers and others in the course of their responsibilities. Such equipment includes conducted body worn cameras, firearms, helmets, riot shields, body armor, clothing, and radios (including handheld or body worn two-way radios), and each has its own use case.

In its quest to subdue and control suspects, it is clear that minimizing the use of additional information can increase safety for both law enforcement officers and suspects. Thus, minimizing the use of firearms and related devices, whether lethal or nonlethal, is a desirable goal, and law-enforcement officers have turned to radios and body-worn cameras to coordinate and catalog their efforts, keeping safe both suspects and law-enforcement officers. Radios and body-worn cameras, however, have limited effect when an officer encounters a suspect with a hidden weapon.

Thus, a need exists for a way of maximizing the safety of both suspects and law-enforcement officers, while minimizing the use of force to situations where such use is absolutely necessary, such as where a resisting subject is carrying a concealed weapon.

SUMMARY

Embodiments of the present invention involve breakthrough innovations to revolutionize how law-enforcement personal equipment can be used to safely and lawfully interact with a suspect by determining whether a subject is armed and thus presents deadly risk to law enforcement. Embodiments include using types of personal devices such as such as firearms, body-worn cameras, riot shields, helmets, body armor, clothing, or two-way radios, where the device includes or is otherwise in communication with a radar system capable of detecting objects hidden under, for example, people's clothing, or within a bag, or elsewhere. Using embodiments of the present invention, a user can safely conduct a weapons search without being in physical contact with the subject being searched, and if no weapons are determined to exist, the user may consider a reduced use-of-force, including eliminating the use of a weapon based on an assumption that less forceful means may be deployed after the device confirms the absence of weapons. If weapons or other impermissible objects are determined to exist, firearms can be deployed, or radios can be used to call for backup, or body-worn cameras can record and share information among different officers, and with a command center.

Embodiments of the invention include radar components configured to be in contact with various handheld or worn devices (pieces of equipment or personal devices (e.g., a body-worn camera, a firearm, riot shield, helmet, clothing, body armor, or a radio) with sufficient ranging resolution and lateral resolution to determine if a target includes an impermissible device, and in communication with a database that can receive scanning data from the radar components and provide information to one or more users such as law-enforcement officers to determine whether an impermissible object is being concealed. In an embodiment, radar components such as a low noise, high bandwidth Voltage Controlled Oscillator (VCO) to attain a center frequency exceeding 200 GHz, a coherent mixer that improves receive sensitivity by 1000× over existing solution, and a full on-chip multi-element scanner that eliminates the need for external antennas or element arrays, are employed.

Embodiments of the invention include a method or methods for subduing or controlling a subject after finding a concealed-object detection using one or more handheld or body worn, portable, battery operated, electromagnetic scanning apparatuses configured to operate at distance of two to ten feet. In an embodiment, the operator conducting the object search positions the subject to be scanned at a distance of up to approximately six to ten feet (or more as power and context permit) from the apparatus and initiates the scan using the electromagnetic scanning apparatus. In an embodiment, the electromagnetic scanning portion of the system is of a shape and size to allow it to be used in conjunction with, and as part of, a user's other equipment, and emits non-visible electromagnetic radiation in a frequency range to provide sufficient resolution to determine with a target of the scan includes an impermissible concealed object. In an embodiment, electromagnetic scanning portion of the system emits non-visible electromagnetic radiation in the Terahertz (THz) frequency band between approximately 0.1 to 1 THz as part of the scanning process.

In an embodiment, the apparatus employs a phased array antenna on a chip in conjunction with a voltage controlled oscillator (VCO) to steer the emitted beam both vertically and horizontally to transmit electromagnetic radiation and deterministically illuminate the subject of the scan. Reflected electromagnetic radiation is received by an antenna on the apparatus and coherently mixed with the transmitted signal, allowing differential phase and amplitude information to be recovered. In an embodiment, the received signal is converted from time domain to frequency domain creating data that is used to produce an image. In an embodiment, the resultant image is further processed using a pattern matching algorithm (or a combination of algorithms) to identify objects within the field of view of the apparatus. The objects can be compared against a database of known objects and the operator is alerted and/or the CEW is activated in the case of a match, or not engaged (or disabled) in the case of no match.

In an embodiment, the apparatus is configured to show only suspicious objects on a representation of a subject's body, and not to provide any images of the subject's actual body. In an embodiment, the apparatus is configured to provide a visual representation of a suspicious object. In an embodiment, the apparatus is configured to display where on a subject's body the suspicious object can be found. In an embodiment, the apparatus is configured to provide an audible, visible, or mechanical warning that a suspicious object exists, thus allowing allow the searcher to keep their hands free during the scan. In an embodiment, the apparatus is used in a handheld body worn mode. In an embodiment, the apparatus is used in a hands-free mode, and can be attached to the searcher's clothing or hung from the searcher's body, or attached to the searcher's equipment or personal devices. In an embodiment, the apparatus can be attached to airborne or terrestrial vehicles, such as, but not limited to drones, automobiles, or robotic systems. In an embodiment, the apparatus can be used in conjunction with, or as part of, a body-worn camera. In an embodiment, the apparatus can be configured to be in communication with a network, and can upload both scanned data and metadata related to the scanned data, to a cloud-based or network-based system for further analysis and storage.

In addition to object detection, in embodiments, the apparatus can be configured to provide an image of a scanned subject's facial features even where the subject is wearing a mask or other clothing or covering. The resultant images can be subsequently used to determine the subject's identity either visually or through the use of a facial recognition system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," "memory," or any other computer-related component recited, is intended to mean one or more of that component, or a combination thereof. The term "on a chip," on the other hand, is intended to mean on a single chip.

Figure 1:
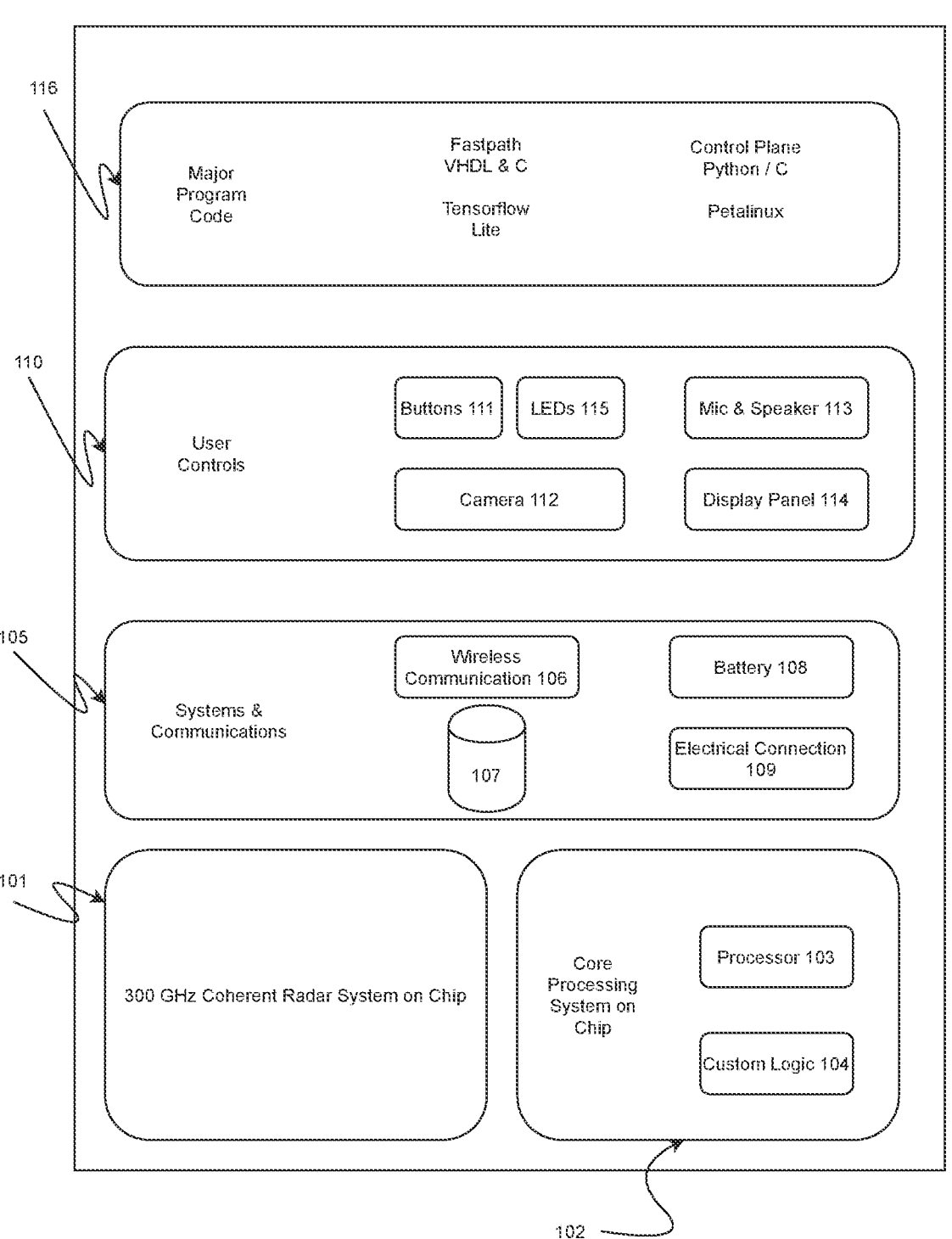
FIG. 1 is a block diagram of a system for providing a noninvasive imaging and detection system, according to an embodiment of the invention.

FIG. 1 is a block diagram of a system for providing a system for noninvasive imaging and detection. In an embodiment, the system comprises a coherent radar system on a chip 101, in communication with a core processing system 102. The core processing system 102 includes a processor 103 and custom logic 104.

The coherent radar system on a chip is configured to provide both range resolution and lateral resolution that is orders of magnitude greater than is found in the prior art. For a single radar chirp emitted by the chip, range resolution, which refers to the quantifiable distance to an object, is directly related to the bandwidth (fmax−fmin), where the available bandwidth is typically 5%-15% of the transmitted center frequency. Thus, the higher the center frequency, the higher the available bandwidth, and so the higher the ranging resolution. Because the chip is designed to operate in the THz range, the ranging resolution may be used to distinguish distances in the sub-millimeter range.

Lateral resolution, on the other hand, relates to the quantifiable distance between samples of perpendicular cross section (e.g., side to side and top to bottom). In other words, lateral resolution relates to feature resolution of a scan. As the transmitted signal is swept across the target (i.e., the target is scanned), the resultant received signed is processed to show variations in reflectivity from the scanned target. These variations can be processed by using standard techniques such as, but not limited to, a Fast Fourier Transform (FFT) to produce an image. The feature size, or resolution of the image, is directly proportional to the wavelength of the emitted source where the shorter wavelength provides increased resolution. Another way to describe this is to say lateral resolution is a function of both beamwidth and steering. Beamwidth is a function of wavelength divided by antenna dimension. As the frequency of the beam increases, its wavelength decreases, and hence, the beamwidth decreases. In addition, the more antenna elements found on the chip, the larger the dimension, and thus the tighter the beamwidth. The tighter the beamwidth, the higher the resolution of distinguishing cross-sectional differences. Thus, in the THz range where the chip operates, the device can provide sub millimeter lateral resolution. Coherence is used to achieve high receiver sensitivity, and allows for recovery of the difference of frequency between transmit and source. This high receiver sensitivity is used to obviate the need for transmitting a signal on the order of >1,000× or 30 dB higher in power, which would not allow for a single chip implementation of the radar.

In an embodiment, core processing system 102 includes processor 103 and custom logic 104. Processor 103 is configured to process instructions to render or display images, initiate a scan, process the results of a scan, alert the user, and provide the results of an object match, if any, to the user. Processor 103 can be any of a variety and combination of processors, and can be distributed among various types and pieces of hardware found on the apparatus, or can include hardware distributed across a network. Processor 103 can be an ARM (or other RISC-based) processor. Additionally, such processors can be implemented, for example, as hardware modules such as embedded micro-processors, Application Specific Integrated Circuits ("ASICs"), and Programmable Logic Devices, including flash memory ("PLDs). Some such processors can have multiple instruction executing units or cores. Such processors can also be implemented as one or more software modules in programming languages as Java, C++, C, assembly, a hardware description language, or any other suitable programming language. A processor according to some embodiments includes media and program code (which also can be referred to as code) specially designed and constructed for the specific purpose or purposes. Custom logic 104 can include one or more Field Programmable Gate Array(s) (FPGA) or any type of PLD for custom logic to support processing offload from Processor 103. In an embodiment, the term "processing offload" includes digital signal processing and digital beam forming.

In communication with coherent radar system 101 and core processing system 102, are the systems and communications circuits 105, comprising wireless communications circuits 106, Memory 107, power source 108, and an external electrical connection 109. In an embodiment, the components may be housed within a single housing; in an embodiment, the components, including the coherent radar system on the chip 101, the memory 107, may be stored in separate housings as a need arises to separate chip 101 from memory 107.

Wireless communications circuits 106 can include any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection.

Memory 107 can be used to store, in computer code, artificial intelligence ("AI") instructions, AI algorithms, a catalog of images, device configuration, an allowable, calculated, or predetermined user workflow, conditions for altering, device status, device and scanning configuration, and other metadata resulting from the scanning process. Memory 107 can be a read-only memory ("ROM"); a random-access memory (RAM) such as, for example, a magnetic disk drive, and/or solid-state RAM such as static RAM ("SRAM) or dynamic RAM ('DRAM), and/or FLASH memory or a solid-data disk ("SSD), or a magnetic, or any known type of memory. In some embodiments, a memory can be a combination of memories. For example, a memory can include a DRAM cache coupled to a magnetic disk drive and an SSD. Memory 107 can also include processor-readable media such as magnetic storage media such as hard disks, floppy disks, and magnetic tape; optical storage media such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices and chips.

Power source 108 can include any type of practicable battery, including but not limited to, Lithium-ion, Nickel Cadmium, Nickel-Metal Hydride, and alkaline. Power source 108 can comprise an external power source coupled to circuitry internal to the device. USB connection 109 can be used to put the apparatus in communication with a network, or can be used to provide an electrical connection to charge or power the apparatus.

In an embodiment, the apparatus further includes User Controls 110. User Controls 110 include user buttons 111 to manipulate the apparatus to turn the device on and off, to set the resolution, configure the device, or select a preconfigured setting, initiate a scan, initiate a connection with the cloud based service via one of the network interface (e.g., Wi-Fi, cellular, Bluetooth, or any other practicable interface) and control the camera functions. LEDs 115 can be used to provide feedback and information to the user about the state of the device, or about the results of a scan. Camera 112 is configured to capture optical images, and a microphone and speaker 113 are configured to facilitate communication, including communication to third parties, or communication with the device through voice or audio commands, and for the device to provide sound to the user such as one or more alarms or notifications. Display panel 114 can be an LCD or other type of display panel configured to display messages to the user, or to provide images representing the results of a scan.

In an embodiment, the apparatus comprises major program-code components 116 used to operate and control the device, which can include the computer instructions executed by the apparatus in performing a scan, and other functions of the apparatus. Program-code components 116 can include, but are not limited to, micro-code or micro-instructions, machine instructions (such as produced by a compiler), and files containing higher-level instructions that are executed by a computer using an interpreter. Program code can include hardware, software, firmware, and any practical way of coding. For example, an embodiment may be implemented using HTML, Java, C++, or other object-oriented programming language and development tools. Additional examples of program code include, but are not limited to, control signals, encrypted code, and compressed code. Major program code can include, but is not limited to, a standard operating system (e.g., Linux), hardware drivers for software-managed hardware elements, machine-learning inferencing, image processing, image storage and retention, cloud-service interface, scanning process, user interface, device management, cryptographic functions, user access management, and device health.

Figure 5:
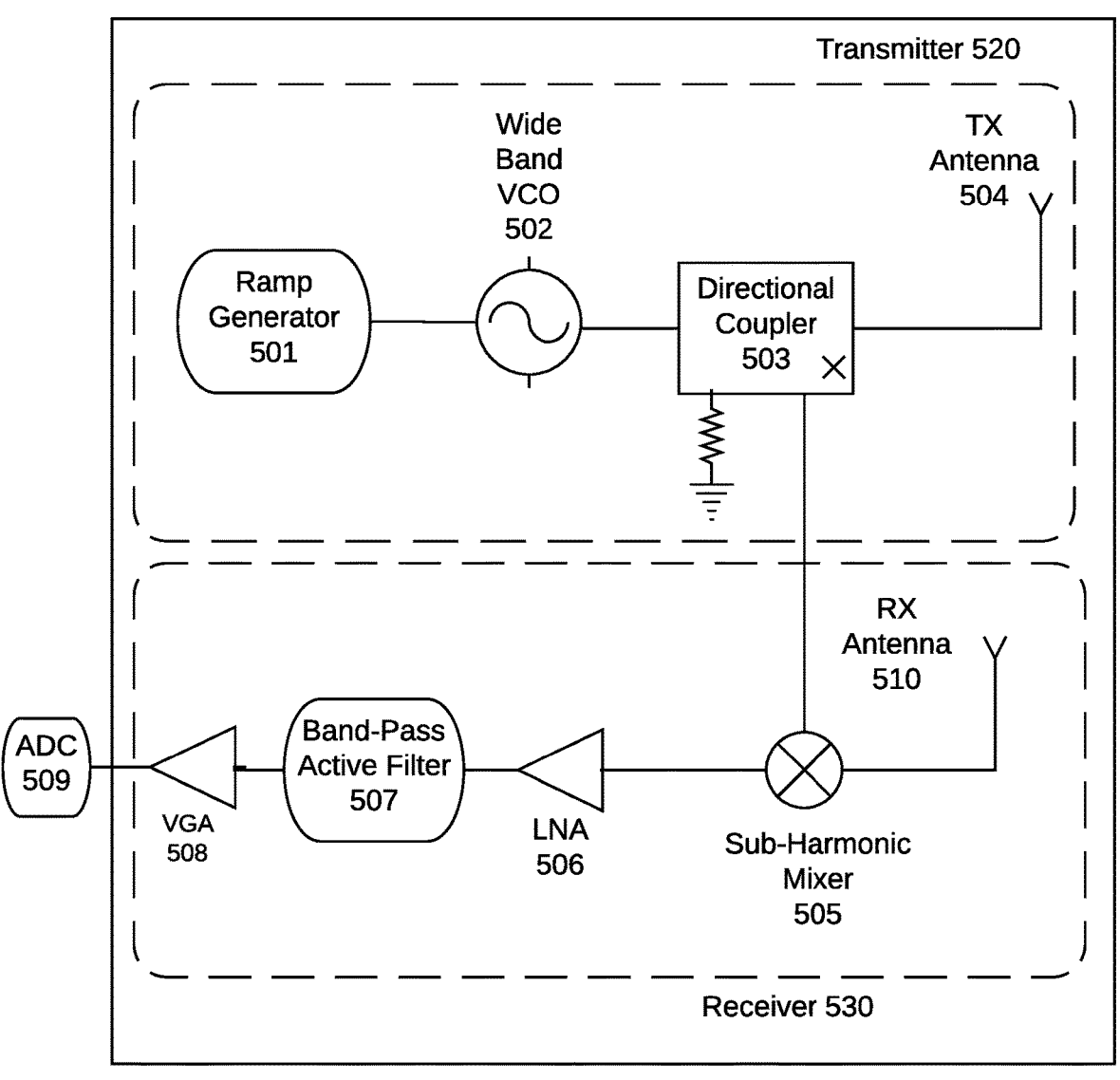
FIG. 5 is a block diagram of a schematic for a radar system on a chip (RSOC), according to an embodiment of the invention.

FIG. 5 is a block diagram for a schematic of a radar system on a chip (RSOC) used in an apparatus, according to the present invention. Notwithstanding anything else in the application, one skilled in the art will understand that the RSOC includes all the elements described with regard to FIG. 5 on a single chip (with the exception of ADC 509, addressed below). Generally, the RSOC transmits the high frequency signals via TX antenna 504, and receives the reflected signal via RX antenna 510, to produce a baseband analog signal that is digitized by an external analog-to-digital converter (ADC 509) and processed by digital processing logic and a CPU to product a visible image of the scanned target. The RSOC consists of two major functions; 1) A transmitter that produces the radar signal and initiates the scan and 2) a receiver that receives the reflected signal and recovers differential phase and frequency information, and provides that information to the digital processing system.

In an embodiment, Transmitter 520 consists of 4 major functional components: Ramp Generator 501, Wide-Band Voltage Controlled Oscillator (VCO) 502, Directional coupler 503, and a Phased-array element array 504. Ramp generator 501 is configured to provide a voltage signal to Wide Band VCO 502, which controls the center frequency of the VCO nominally centered between approximately 0.1 to 1 THz. Ramp Generator 501 is configured to move the center frequency of Wide Band VCO 502 over a predetermined frequency that creates a frequency sweeping action to produce the radar scan. Ramp Generator 501 can generally produce a sawtooth voltage waveform, however, other waveforms such as ramp, sinusoid, flat, or combinations thereof, may be employed as well. The Wide Band VCO 502 can be is implemented to produce low phase noise, thus improving the receiver's receiver sensitivity. The signal from Wide Band VCO 502 can then be provided to Directional Coupler 503, which can create at least two coherently related identical versions of the input signal. One of the two versions of the input signal is provided to the sub-harmonic mixer as a coherent reference, and the other version of the input signal is provided to the phased array element antenna. Each element in the system acts as an antenna and employs a phase-locked oscillator coherently related to the signal from Wide Band VCO 502 to ensure a fixed phase relationship from adjacent transmitting elements, which can be used for, for example, to attenuate unwanted sidelobes. The high frequency energy produced by the elements is focused using an external radar lens (not shown), generally implemented as a hemispherical component of radar transmissive material, to scan the target and create the reflected high frequency energy to be received by Receiver 530.

Receiver 530 consists of 5 major functional elements: 1) Receive Antenna (RX Antenna) 510; 2) Sub Harmonic Mixer 505; 3) Low Noise Amplifier (LNA) 506; 4) Band Pass Active Filter 507; and 5) Variable Gain Amplifier (VGA) 508. Receive Antenna 505 is configured to receive the reflected signal broadcast by the transmitter and reflected from the target. RX Antenna 510 may be implemented as a dipole antenna, or by any other practicable antenna configuration. The signal received at RX antenna 510 is provided to the sub-harmonic mixer, which can then create sum and difference frequencies based on the reference signal provided by the transmitter. The sum and difference frequencies are coherently related, and enable the receiver to recover differential phase and frequency, thus improving the noise figure of the receiver by up to approximately 10,000× (or 40 dB) as compared to traditional non-coherent receivers. LNA 506 is used to amplify the signal as required by Band Pass Active Filter 507. Band Pass Active Filter 507 filters off undesirable harmonics created by the Sub-Harmonic Mixer 505. The term 'active' refers to the use of active elements to include linearly biased transistors in conjunction with reactive and passive elements to provide the bandpass filter with minimized or reduced noise and phase distortions of the passed signal. VGA 508 receives the signal from band-pass filter and amplifies and provides the necessary impedance matching for external ADC 509. In an embodiment, ADC 509 is implemented functionally on the RSOC. In an embodiment, ADC 509 is implemented external to the RSOC.

Figure 2:
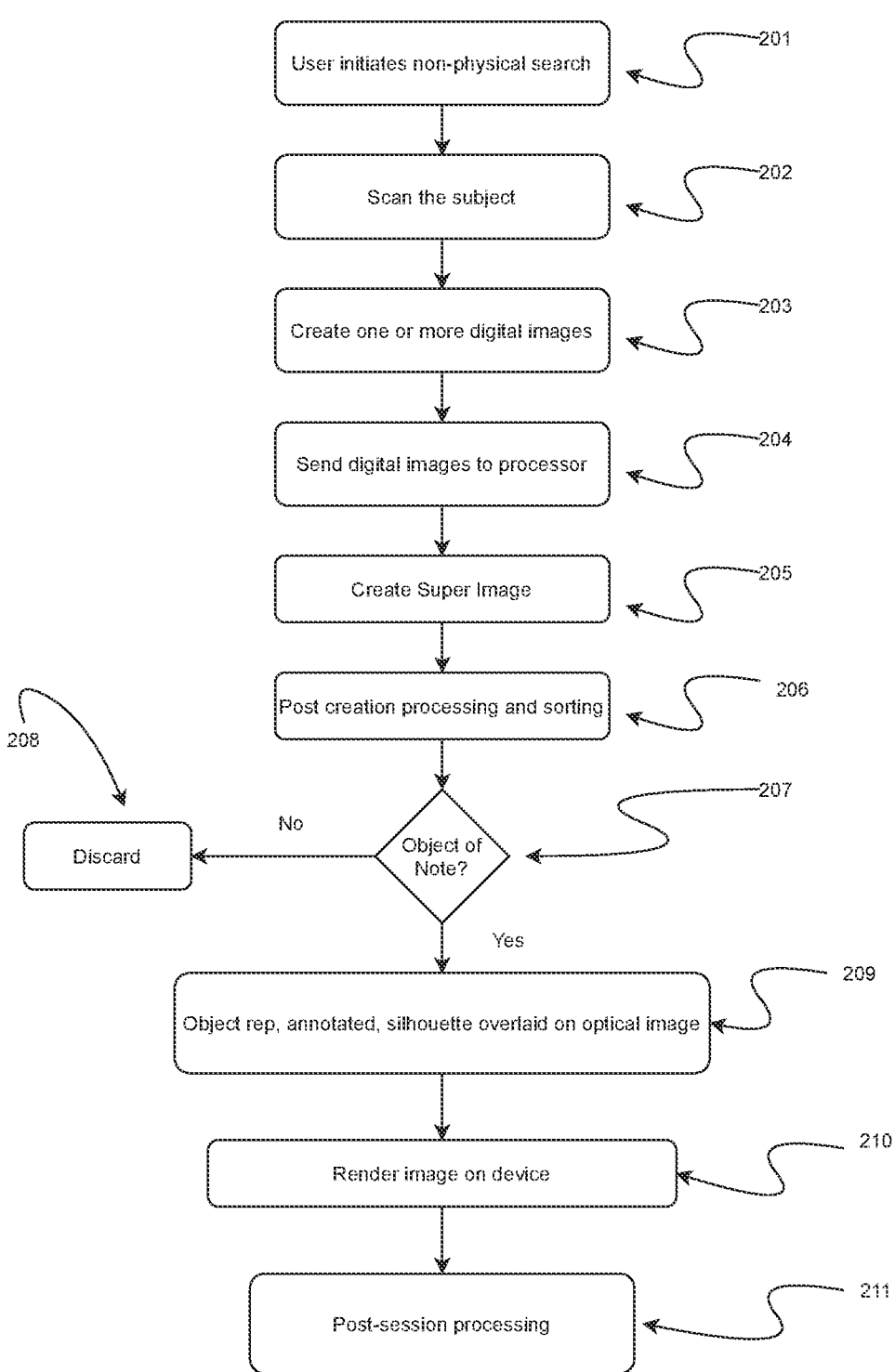
FIG. 2 is a flow chart of a process for noninvasive concealed-object detection, according to an embodiment of the invention.

FIG. 2 is a flow chart of a method for using a non-invasive scanner for creating images useful for imaging and detection. Prior to use, in an embodiment, the apparatus will have, and will be in, one of a set of operational modes and or states, including a low-power or standby mode, a synching mode, and an off mode. A user can generally tell, based on the apparatus's display, whether the apparatus is in an operational mode or not. In an embodiment, the apparatus will be able to show the local user which state the apparatus is in, via LEDs, local LCD panel, or using an audible warning. If the apparatus is in an off mode, then the apparatus is powered off and does not perform any scanning. In an embodiment, the apparatus can be in a state that requires user interaction to set up the apparatus in sync mode and connect it to an online network for backup and additional functionality such as uploading data and metadata. In an embodiment, the apparatus can be set to sync automatically through the online network.

In sync mode, the apparatus can send and receive operational control parameters such as a cryptographic device key for device or user login to the system, user-configuration data detailing, for example, who is using the apparatus, what organization or department the user belongs to, updates to the machine-language inferencing engine, relevant (e.g., user or departmental) policies and controls, including general policies on alert, event, and trigger actions. In addition, the operational control parameters can include information detailing how full the device disk is, and whether upload is required. In an embodiment, the machine-language inferencing engine is the process that performs the object pattern matching and subsequent identification. In an embodiment, it can be implemented in software and accelerated using and FPGA. In an embodiment, it can be implemented in hardware. In an embodiment, it can be implemented in any practicable combination of hardware and software.

In the low power or standby mode, in an embodiment, the apparatus is operational and ready for use. In an embodiment, network access exists, along with a live connection to any related network services. In another embodiment, no network access exists. The apparatus can include sufficient local storage and processing power for operating independent of a network. The apparatus can further include a timer along with a device key to allow a user to use the apparatus as long as the timer has not timed out, thus ending the user session on the apparatus.

In embodiments, other modes that can be used by the apparatus include active-target-acquisition mode, and active-non-physical-search-in-process mode. In active-target-acquisition mode, the apparatus will show or relate the field of view to the user with an active camera and preparing to go to state 5. State 5 defines the system being in the active state of a non-physical search. In this state, the apparatus imaging system pipeline and real-time alerts and notifications are active.

In an embodiment, if the device is ready for use, then at 201, the user initiates a non-physical search of a subject. In an embodiment, the initiation of the non-physical search can begin with a user setting up a subject between 5 and 10 feet away from the apparatus. The subject can then be asked to look at the user and/or the apparatus. The user can then point the apparatus toward the subject and turn on the scanning function of the device via a button, trigger, voice control, or other control switch.

At 202, in an embodiment, the apparatus scans the subject. To do this, in an embodiment, the radar system on a chip generates a radar signal and sweeps a predetermined field of view, emitting a radar signal in the 0.1 to 1 THz range. The apparatus employs a phased array antenna in conjunction with a voltage controlled oscillator (VCO) to steer the emitted beam to transmit electromagnetic radiation and deterministically illuminate the subject of the scan, according to an embodiment. To complete the scan, the emitted signal interacts with the subject, and a certain amount of the electromagnetic radiation is reflected back and received by an antenna on the apparatus. The received signal is coherently mixed with the transmitted signal allowing differential phase and amplitude information to be recovered. In an embodiment, the transmit signal is combined, or mixed, with the returning signal allowing for recovery of frequency and phase information in the receive signal.

At 203, in an embodiment, the analog signal from the scan is converted to a digital format using one or more analog-to-digital converters (ADCs) to create a digital image that can be forwarded to the processing complex of the apparatus. In an embodiment, the process of scanning and creating an image can be repeated a predetermined number of times (programmed into the apparatus or selected by the user) creating multiple digital images.

At 204, in an embodiment, the multiple images are sent to the processor, and in 205, the multiple images are combined in the processor to form a super image to enhance resolution, creating a super image. The steps of this super imaging process are detailed in FIG. 3, discussed below. At 205, the feature resolution of the image is enhanced, thus improving the chances for object recognition in 206.

Once the post creation processing and sorting has been performed at 206, a determination is made at 207 as to whether an object of note is found. If an object of note is not found, at 208 the image and its corresponding data can be discarded. If an object of note is found, then at 209, the object of note is superimposed as an outline over an outline of the scanned target, and at 210, the final image is presented to the user. The image can be rendered on a screen on the device. Optionally, the image can be rendered on a smartphone or other mobile device. When rendered or displayed, the image can contain the original visual image of the target with representations of objects found. The multiple images can also be combined to create a video stream. And because the scanning process provides ranging information, the device can provide a three-dimensional rendering of the image. In an embodiment, different colors are used to indicate the threat level of the detected object. As an example (but not the only example), a red outline displayed on the apparatus can indicate the presence and position of a gun. As another example (but not the only example), a green outline can be used to indicate the presence of keys, or some other equally innocuous object.

In an embodiment, an image of an identified object, or a representation thereof, can be superimposed of a representation of the scanned target. In an embodiment, the representation can be an outline of the scanned target, e.g., a generic outline of a human form, over which the image representing the identified object can be placed, providing the user with information about the positioning of the object on the subject's body, in addition to detailing the threat level of the object. In an embodiment, the representation of the scanned target can take the form of a variety of zones displayed on a screen positioned on the apparatus, or on a mobile device in communication with the apparatus.

Upon completion of a search, at 211, post-session processing takes place. This processing can include all or some of the following: tagging images or videos with metadata, gathering and uploading metadata, generating a report, providing a digital signature or certificate, archiving, and uploading the data (both received and processed) and metadata. In this step, images can be cryptographically tagged with various metadata and transmitted and stored on the device, or can be uploaded for further processing. If a data repository is used (e.g., a cloud-based database or an online server), the images, videos, and metadata can be stored there. In an embodiment, the images, videos, and metadata can be stored proximate to, or as part of, the device. Examples of metadata can include (but are not limited to) time stamps, geolocation data, device data, customer specific information (user, associated visual images), networked or connected devices, voice recordings, and session information. In an embodiment, a web-based service can be implements using public cloud infrastructure and services such as those provided by (but not limited to) AWS, Azure, and GCP.

Figure 3:
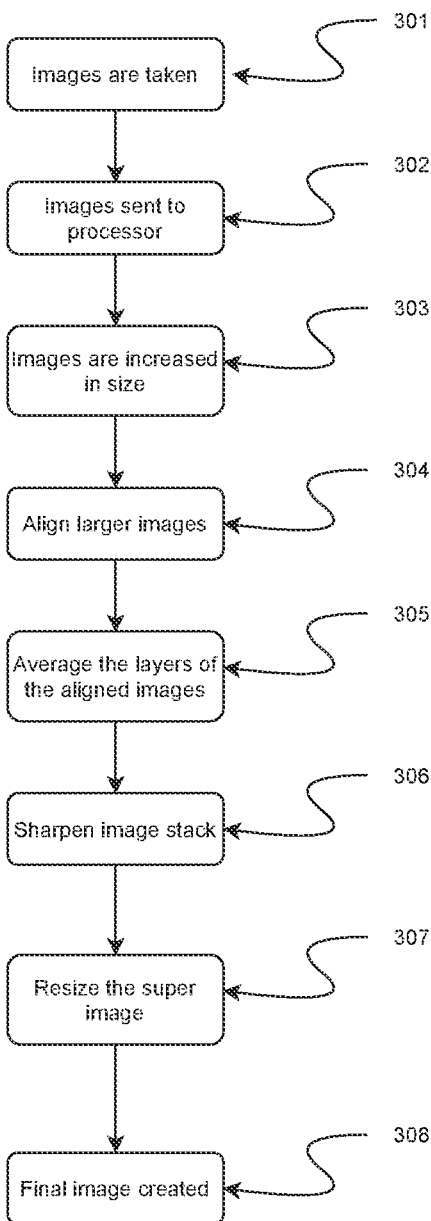
FIG. 3 is a flowchart of a method for creating a dataset from images taken by a non-invasive scanner, the dataset being appropriate for post processing and use in imaging and detection, according to an embodiment of the invention.

FIG. 3 is a flowchart of a method for creating a dataset of images to be used for imaging and detection, according to an embodiment. At 301, one or more images are taken. At 302, the images are sent to a processor for processing. The image or images received at the processor are increased in size by a predetermined amount creating a set of larger images, at 303. In an embodiment, the images are increased in size to achieve finer blending of the image stack in order to extract the high frequency data that is embedded in the low frequency data hidden in the aliasing.

At 304, at least a subset of images in the set of larger images are aligned, according to an embodiment. In an embodiment, at 305, the layers are averaged with linear opacity 1, 0.5, 0.25, 0.125, and so on, allowing images, in an embodiment, to be blended evenly, making use of the aliasing.

At 306, in an embodiment, the image stack, the plurality of images being combined, is sharpened using a predetermined radius. At 307, according to an embodiment, the final super image is resized. One skilled in the art will understand that the output can be resized to any desirable size using any practicable resampling method that provides an appropriate image. At 308, the super image is used to create the final image (seen in 206 from FIG. 2). Once the super image is created, the image is further processed, as detailed in FIG. 4, discussed below.

Figure 4:
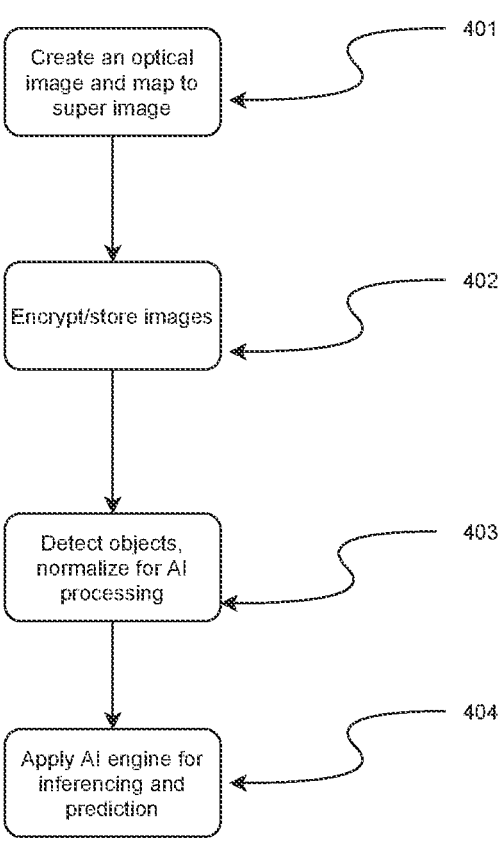
FIG. 4 is a flowchart of a method for processing a final image, according to an embodiment of the invention.

FIG. 4 is a flow chart of a method for processing the existing data to create a final image. At 401, an optical image is created and mapped to the super image creating a filtered image. In an embodiment, the apparatus uses a separate camera to create an optical image used as a base image configured to be mapped to the super image, according to an embodiment. In an embodiment, the separate camera is a digital camera using a CCD sensor, or a CMOS sensor, or any practicable sensor. In an embodiment, the separate camera is a body-worn camera worn by law enforcement.

At 402, in an embodiment, the filtered images are encrypted, while the unfiltered image data is discarded. One skilled in the art will understand that the encryption can be performed using SSL or TLS secure encryption, or any practicable encryption. In an embodiment, the apparatus stores some or all of the filtered image locally. In an embodiment, the apparatus stores some or all of the filtered image in a backend cloud service where it can be archived or undergo additional processing, or both.

At 403, in an embodiment, the super image is analyzed to determine whether any objects of note are present on the subject, and if so, the super image is normalized for processing. In an embodiment, normalizing the super image means preprocessing it into a format, or with information, appropriate to feed an artificial intelligence system. This preprocessing can include (but is not limited to) scaling to a fixed width and height, conversion of the bit depth, shifting and or rotation of image. The processing can be performed by an artificial intelligence (AI) system.

At 404, once the objects have been normalized, the resultant image is transferred to an AI engine for pattern matching against known threats and then calculating the likelihood that the input data is a threat. As part of the image processing, in an embodiment, the apparatus performs an image search to match detected shapes against a prebuilt local image threat library, or a mathematical model representing such images, and makes a threat determination using parameters such as shape type, size, type of weapon, confidence level, contrast, and other parameters. Entries in the threat library can include some or all of the following: guns, knives, bombs and bomb vests, clubs, truncheons, bottles, and other objects of interest. In an embodiment, once a preliminary determination has been made that a weapon is suspected, the apparatus will focus in on the suspected weapon(s) and providing better image resolution to improving the detection confidence. In an embodiment, privacy filtering processing is applied, thus ensuring all locally storage body images are obfuscated as part of the image processing described in FIG. 3.

In an embodiment, the policies and control of the apparatus, the chip, and the general system, can be configured and controlled by a hierarchical set of domains allowing for different domains to grant configuration control to subordinate domains. In an embodiment, the policy and configuration control can be separated from the users of the device to ensure compliance, operational procedures, and in general simplicity of use. In an embodiment, the policy and configuration control can be performed and input by a local user. In an embodiment, the policy and configuration control and be performed and input using an AI system.

Users can configure policies and alerts for different actions, and to provide feedback in different forms. In an embodiment, alerts can be visual (e.g., providing an outline of an object on a screen). In an embodiment, alerts can be audible (e.g., emitted by a device speaker or through an earpiece). In an embodiment, alerts can trigger or prompt a user for additional actions of a remote device (e.g., via call to API), or other user defined actions.

In general, an event that triggers a display or alert of an unwanted object (as examples) can combined with, and work with, other events using, for example, Boolean logic to form complex triggers. Examples of triggers can include: More than two unidentified objects were found that were larger than a predetermined size. Events can include but are not limited to: an object is identified via machine learning with a predetermined probability; a person is identified via facial recognition, within a predetermined probability; an object of size greater than a predetermined size is found but not identified; an object of size smaller than a predetermined size is found but not identified; a search took place at a certain time of day, or within a certain range of times; and/or whether a contactless Terry Frisk is required; and any other event that can trigger an action.

Examples of alerts and controls can include: logging an event locally or in the cloud; logging an event in the cloud in either real time or in a batch upload; alerting a user with local audio, vibration, light or local display; alerting a user via a headset, earbuds, glasses, or any other remote device; texting to one or more mobile phone numbers or sending an alert to a mobile app; emailing an alert to one or more email addresses; providing a suggestion to a user on what a next step is for them to take, in addition to the alert itself; communicating to other contactless search devices as a remotely generated event; and calling a custom remote API, which can prompt some other action such as unlocking or locking a door, turning lights on or off, or any other customer-defined action.

Figure 6:
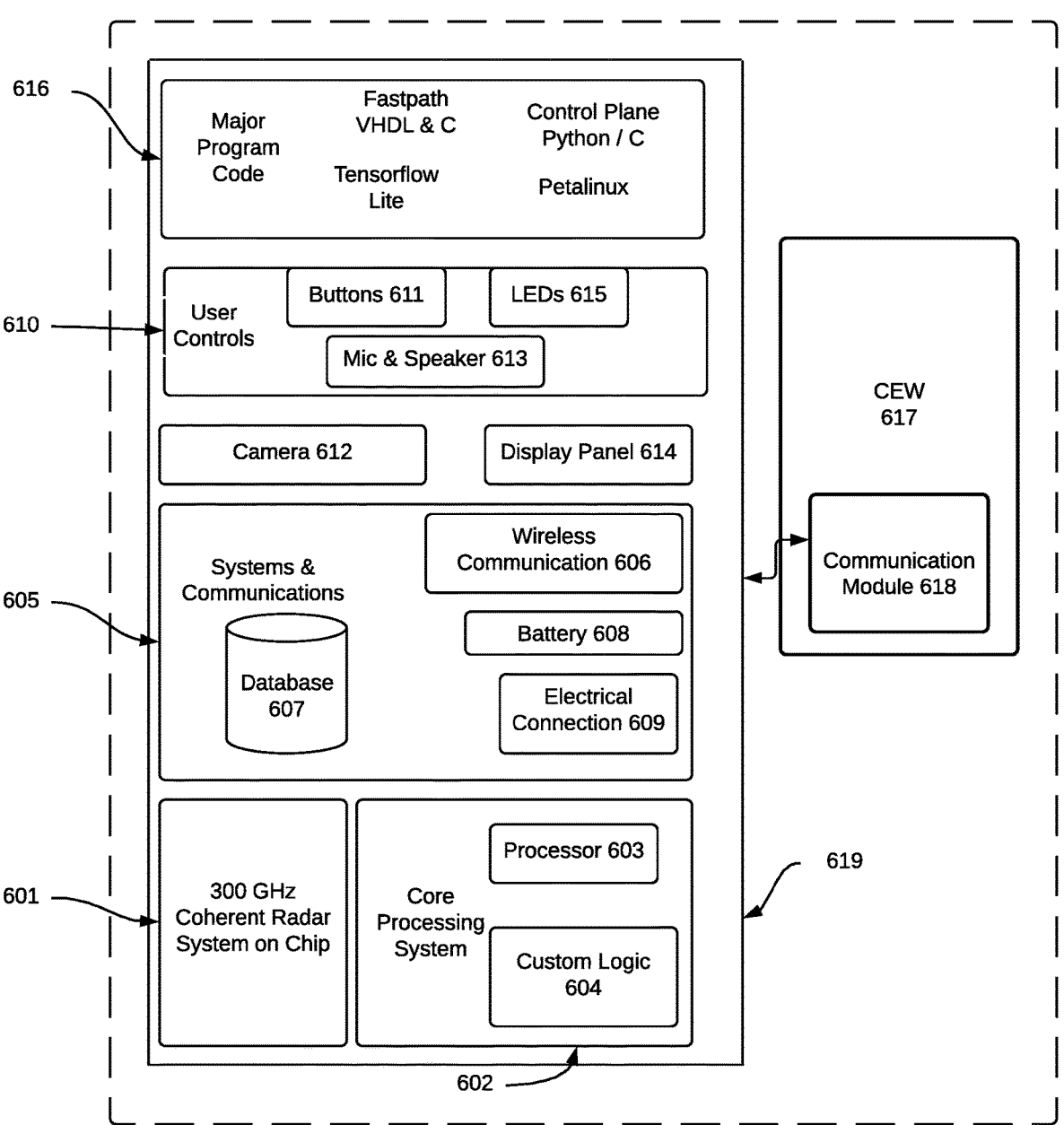
FIG. 6 is a block diagram of a system for providing a system for noninvasive imaging and detection in conjunction with a CEW, according to an embodiment.

FIG. 6 is a block diagram of a system for providing a system for noninvasive imaging and detection such as an electromagnetic scanning apparatus in conjunction with a CEW 617 such as a Taser. For the purposes of the present invention, the term conducted energy weapons (CEW), conducted energy device (CED),projectile electric shock weapon (PEW), are used interchangeable, and can be used to refer to the class of devices that includes Tasers and stun guns, and any other device designed deploy electrodes that transmit an electrical charge or current to temporarily disable a person.

Typically, a CEW is a handheld device with a trigger, a safety, probes wired to a pulse generator and pulse controller, and disposable cartridges that use compress gas such as nitrogen to launch the probes. Once the safety is off and the trigger is depressed, the taser fires two probes into a subject's body. The wires that connect the probes to the pulse generator transmit strong electrical pulses into the subject's body, thus immobilizing or incapacitating the subject by interfering with the subject's nervous system.

In an embodiment, the imaging and detection portion of the system includes a radar system that operates at a frequency to provide sufficient resolution such that the results of the scan can be used to determine whether a target is carrying a concealed impermissible object. In the embodiment in FIG. 6, the imaging and detection portion of the system 619 includes coherent radar system on a chip 601, core processing the system 602, systems and communications components 605 (which can include database 607, wireless communication circuitry 606, battery 608, and electrical connection 609) a camera 612, a display panel 614, user controls, and major program code 616. In addition, the overall system includes a CEW 617 in communication with the imaging and detection system 619 via communication module 618. In an embodiment, imaging and detection system 619 can be replaced with an electromagnetic scanning system such as a radar system with sufficient resolution to determine whether an impermissible object exists on a suspect, in a form factor (i.e., small enough) so that the that scanning system allows for coupling with the CEW in a practical way. In an embodiment, the CEW 617 and imaging and detection system 619 are contained in a single housing. In an embodiment, the CEW 617 and imaging and detection system 619 are contained in separate housings but in communication with each other by a wired communication connection. The wire that provides the wired communication can be detachable from CEW 619, imaging and detection system 619, or both. In an embodiment, CEW 617 and imaging and detection system 619 are contained in separate housings but in communication with each other by a wireless communication connection.

In an embodiment, the radar system 601 is included in a housing distinct from the housing that contains CEW 617. The housing that contains CEW 617 can include the core processing system to provide digital processing to the data received from radar system 601. In an embodiment, the housing that contains CEW 617 can include a combination of core processing system 602, systems and communications 605, camera 612, display panel 614, and user controls 610.

In an embodiment, the apparatus further includes User Controls 610. User Controls 610 include user buttons 611 to manipulate the apparatus to turn the device on and off, to set the resolution, configure the device, or select a preconfigured setting, initiate a scan, initiate a connection with the cloud-based service via one of the network interface (e.g., Wi-Fi, cellular, Bluetooth, or any other practicable interface) and control the camera functions. LEDs 615 can be used to provide feedback and information to the user about the state of the device, or about the results of a scan.

In an embodiment, CEW 617 will not be allowed to deploy until it receives a signal from imaging and detection system 619 that an impermissible object is present. Thus, if the system scans a subject but does not detect a weapon or other predetermined device, CEW 617 may not release the safety, or may not charge its electrodes, or may provide a signal to allow the electrodes to be deployed. In an embodiment, if imaging and detection system 619 determine that a predetermined object or class of objects is present, it can send a signal to CEW 617 that allows CEW 617 to be used on the subject.

In an embodiment, processor 603 includes logic that is programmable by the user to determine whether and under what conditions to allow CEW 617 to be used on a subject. For example, a user may program the device, or may simply press a button or select from a menu on display panel 614 a condition-based choice. In an embodiment, the device can be programmed, in the event the scan does not detect a weapon, to alert the user, to alert the user and not arm the CEW, to lock the device's safety, a choice to prevent the device from charging its electrodes, or a choice to otherwise not deploy the electrodes. In an embodiment, the device can be programmed, in the event the scan does, indeed, detect an impermissible device, to (i) alert the user; (2) alert the user and arm the CEW; or (3) alert the user and fire the CEW.

Figure 7:
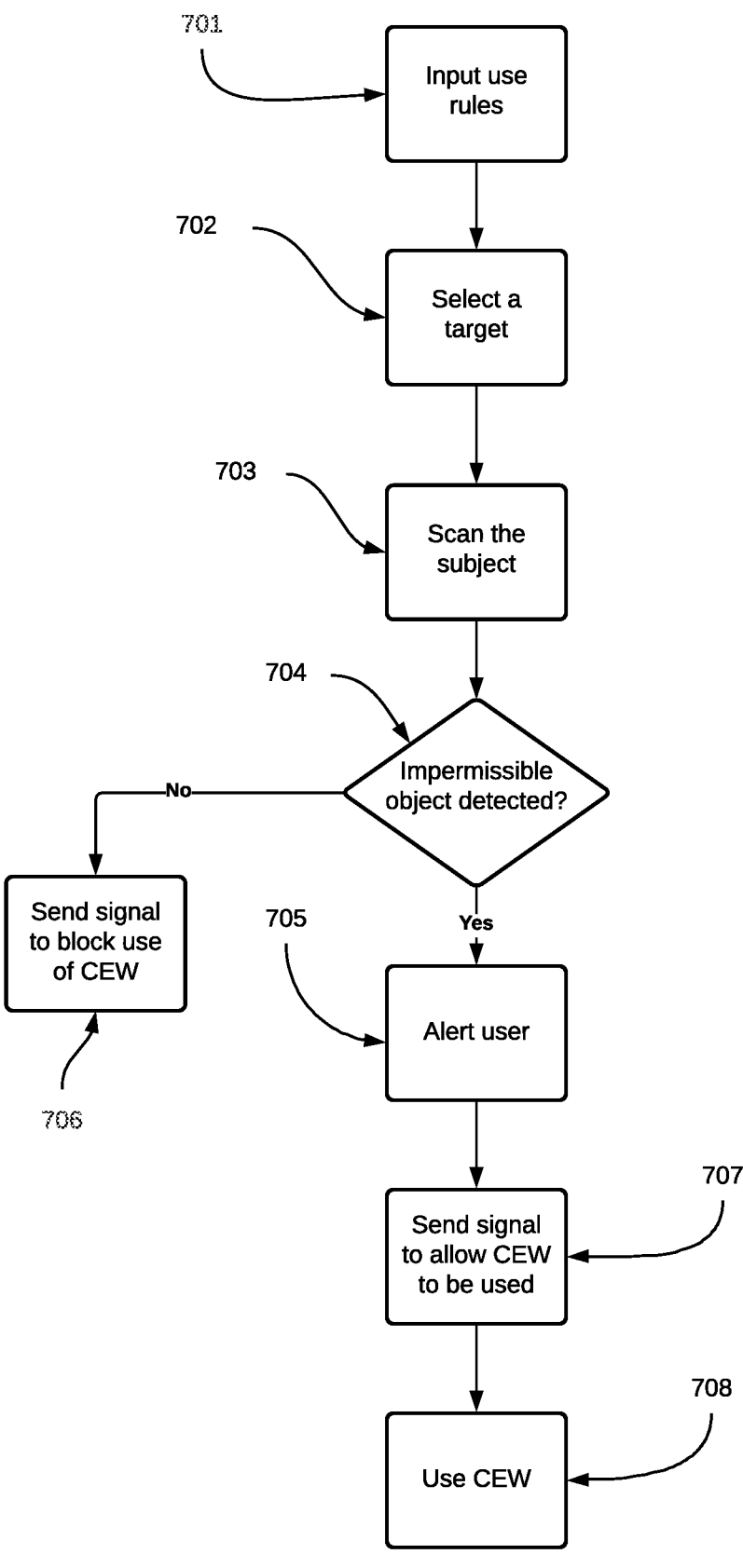
FIG. 7 is a flowchart of a method of using a radar system in conjunction with a CEW, according to an embodiment.

FIG. 7 is a flowchart of a method of using the system, according to an embodiment. At 701, rules for using the CEW in conjunction with the scanning function are input into the device. For example, the rules can allow the device to automatically deploy the electrodes if a weapon is detected, or can prevent the CEW from being used unless and/or until a weapon is detected.

At 702, a target is selected, typically by pointing the device is pointed at a subject. At 703, the device scans the subject, and, at 704, determines if an impermissible object is detected. If an impermissible object is detected at 704, then at 705, a processor sends a signal alerting the user to the existence of the impermissible object. In an embodiment, if an impermissible object is not detected at 704, then at 706, a signal is sent to prohibit the use of the CEW. For example, a signal could be sent locking the devices safety in place, or a signal could be sent preventing the charging system from charging the device, or sending a signal blocking the electrodes from being deployed. At 707, the processor sends a signal to allow the CEW to be used to incapacitate the subject. Finally, at 708, the user uses the CEW with the intent to incapacitate the subject.

Figure 8:
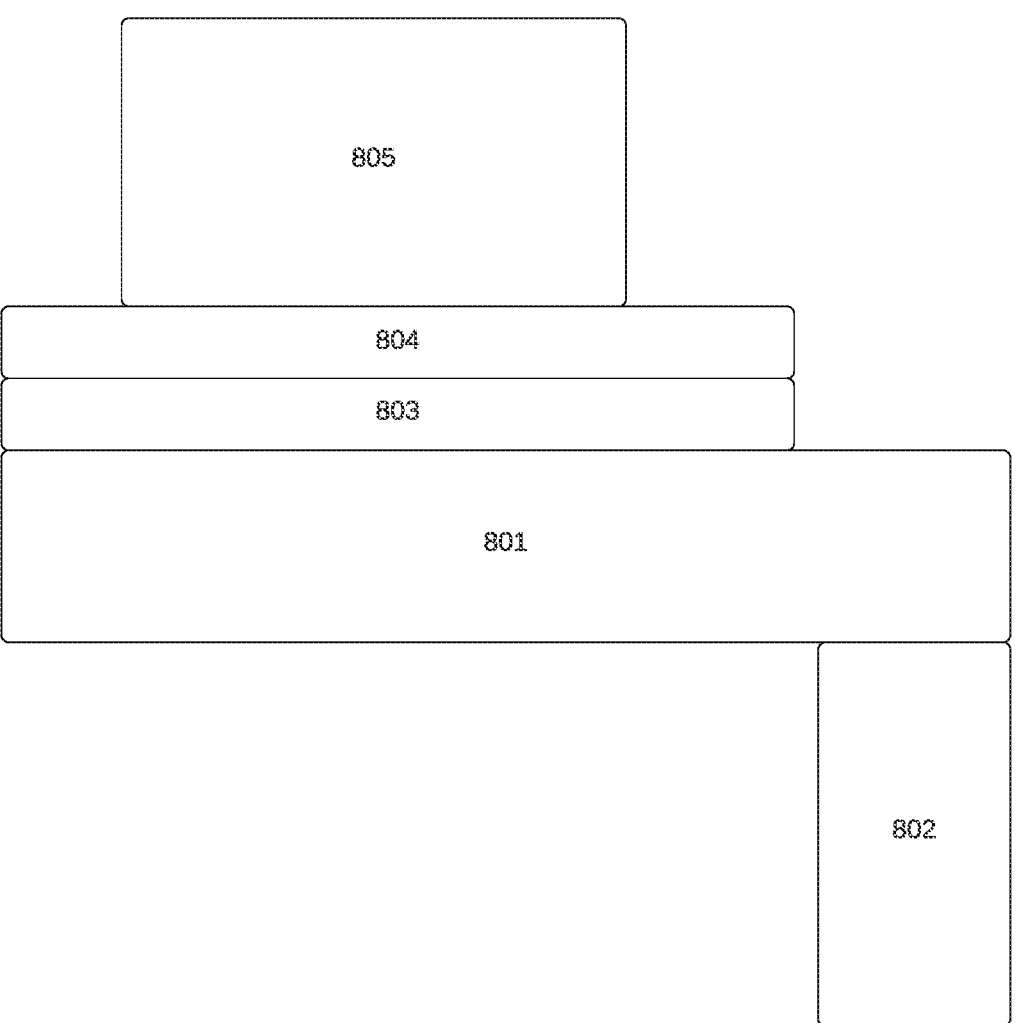
FIG. 8 is a block diagram of a system for providing a system for noninvasive imaging and detection in conjunction with a firearm, according to an embodiment.

FIG. 8 is a block diagram of a system for providing a system for noninvasive imaging and detection in conjunction with a personal device such as a firearm, according to an embodiment. For the purposes of the present invention, the term "personal device" means any handheld or body worn personal device. For the purposes of the present invention, the term "firearm" includes any gun designed to be handheld such as a rifle (whether automatic, semiautomatic, or otherwise), shotgun, handgun, and the like. Blocks 801 and 802 are a representation of a firearm, with 801 representing the barrel of the firearm and 802 representing the handle. In an embodiment, the firearm is a handgun. In an embodiment, the firearm is a rifle.

The firearm is mechanically coupled to radar device 805 via firearm mount 803, which can be mounted in any known way, whether along the top of, or along the bottom of, or along the side of, the firearm barrel. In an embodiment, firearm mount 803 can be any one of a Picatinny or MIL-STD-1913 rail, a dovetail rail, a NATO accessory Rail, a Warsaw Pact rail, a Zeiss rail, or a Third Arm Weapon Interface System. One skilled in the art will understand that the term "physically coupled," or "in contact with," or "physically in contact with," can mean directly in contact, or in contact via some mounting device. Radar coupling portion 804 is configured to physically couple to firearm mount 803, and is in physical contact with, or physically a part of, the housing of radar device 805 such that radar system 805 can scan a target when pointed substantially in the direction of the firearm barrel. As with the CEW, in an embodiment, radar device 805 includes a radar system that operates at a frequency to provide sufficient resolution such that the results of the scan can be used to determine whether a target is carrying a concealed impermissible object. In an embodiment, the imaging and detection portion of the system includes a coherent radar system on a chip, a core processing system, systems and communications components (which can include a database, wireless communication circuitry, battery, and electrical connection (see FIG. 6)) a camera, a display panel, user controls, and major program code (See FIG. 6). In an embodiment, the housing is configured to be mounted in contact with a the personal device via a coupling system or directly to the housing of the personal device. In an embodiment, the radar system is included in the same housing as the personal device. In an embodiment, the combined personal device and housing have a form factor that allows it to retain its characteristic as a personal device. For example (but not the only example), if a the personal device is a firearm, the combined radar system and firearm, when physically coupled, can still be handheld. As another example, if the personal device is body worn like a body-worn camera or a body-worn two-way radio, the personal device, when physical coupled to the radar still, can still be body worn.

Figure 9:
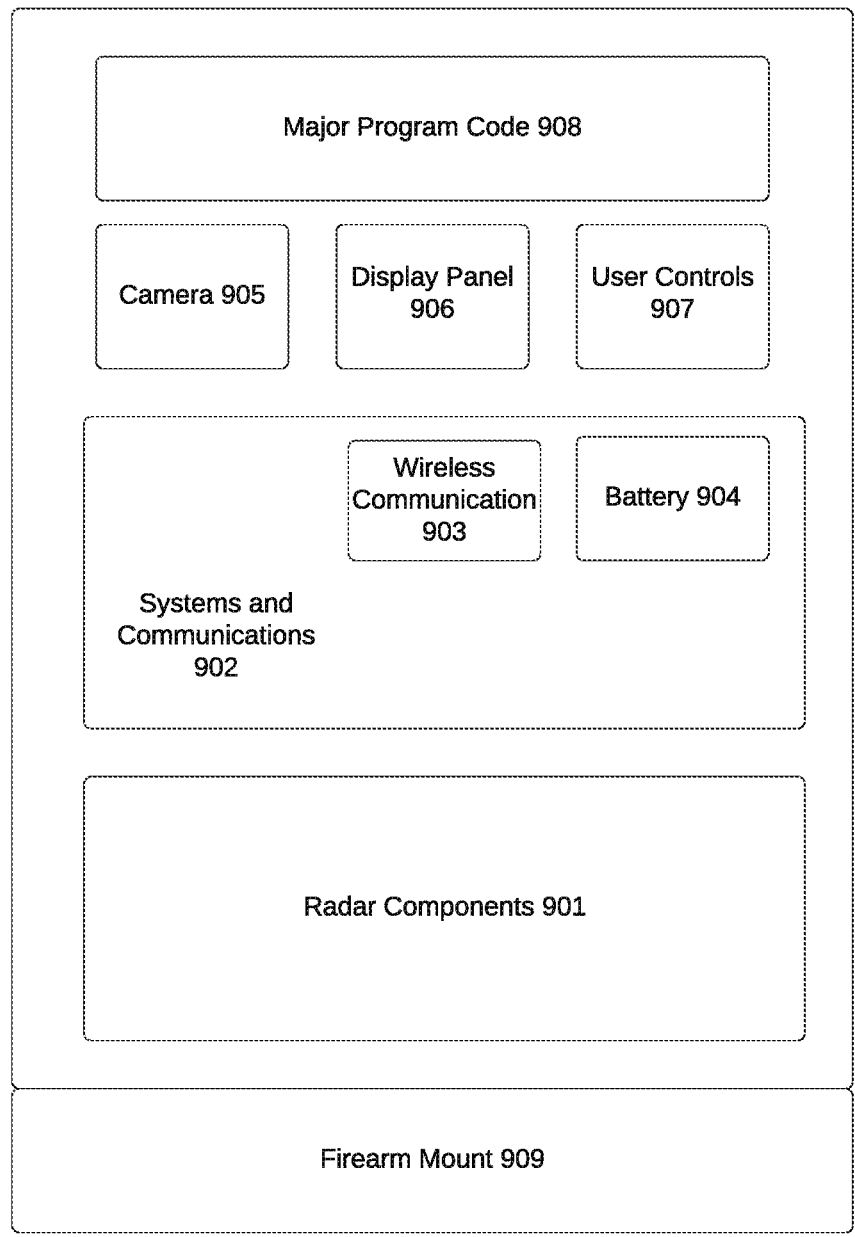
FIG. 9 is a block diagram of a system for providing noninvasive imaging and detection in conjunction with a firearm, according to an embodiment.

FIG. 9 is a block diagram of a system for providing noninvasive imaging and detection in conjunction with a firearm, according to an embodiment. In an embodiment, radar components 901 are in communication with systems and communications modules 902, which include wireless communication module 903, and battery 904. Wireless communication module 903 is configured to send and receive signals across a wireless network. In an embodiment, wireless communication module 903 is configured to send data received from scanning a target to a central management system that can process the data to determine if a threat exists, and if so, the nature of the threat. The results of the processing and analysis performed at the central management system can then be sent back to the radar device and received at wireless communication module 903 for display panel 906 to be viewed by a user. In an embodiment, display panel 906 is physically mounted on the housing containing the radar components. In an embodiment, display panel 906 can be separate from the housing containing the radar components (e.g., the display panel 906 can be found in a heads up display on eyeglasses, or in an additional handheld or body worn device in communication with the circuitry in the housing or with a command center). In an embodiment, the device includes a processor to determine locally whether an impermissible object such as a weapon exists, and further includes a display to alert the user as to the impermissible object's existence, or to show the user where on the target the impermissible object is concealed.

Figure 10:
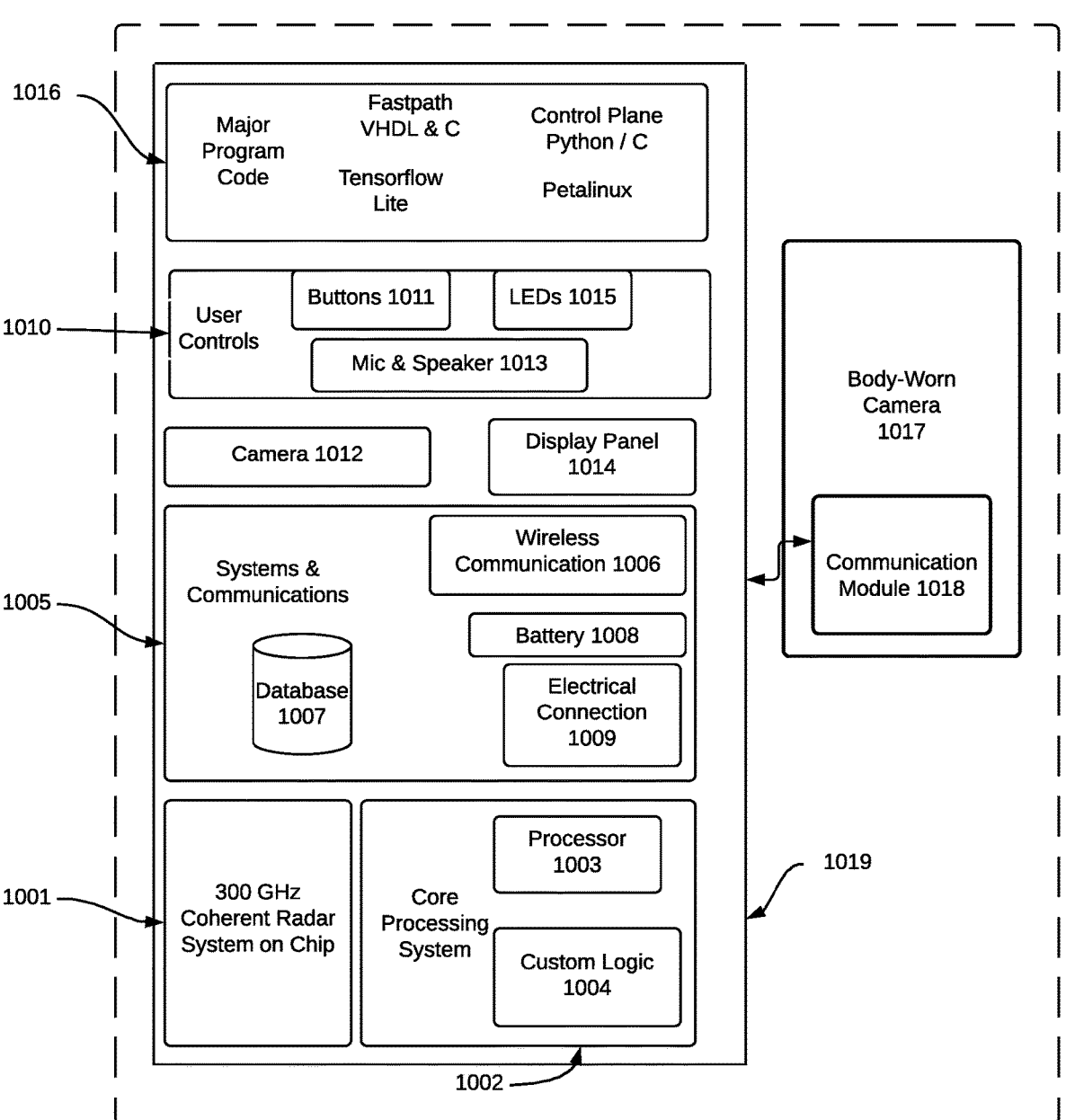
FIG. 10 is a block diagram of a system for providing a system for noninvasive imaging and detection in conjunction with a body-worn camera.

In an embodiment, the radar system includes camera 905, user controls 907 for calibrating and using the radar system, and major program code 908, which is used to run the various parts of the radar system to put those various parts in communication with one another, as needed to use to the system. Attached to the radar system is coupling 909, which is configured to mechanically couple the radar system to a firearm. In an embodiment, the device is capable of providing feedback to the user to make, for example, a shoot/don't shoot determination FIG. 10 is a block diagram of a system for providing a system for noninvasive imaging and detection in conjunction with a body-worn camera, as is worn in law enforcement. In an embodiment, body-worn camera 1017 is coupled with radar system 1019. In an embodiment, the imaging and detection portion of the system includes a radar system that operates at a frequency to provide sufficient resolution such that the results of the scan can be used to determine whether a target is carrying a concealed impermissible object. In an embodiment, the imaging and detection portion of the system 1019 includes coherent radar system on a chip 1001, core processing the system 1002, systems and communications components 1005 (which can include database 1007, wireless communication circuitry 1006, battery 1008, and electrical connection 1009), a camera 1012, a display panel 1014, user controls, and major program code 1016.

In an embodiment, camera 1012 is the body-worn camera 1017 in communication with the radar system (e.g., coherent radar system on a chip 1001), configured and positioned to show where the radar system is pointing for scanning. In an embodiment, camera 1012 is a separate camera from body-worn camera 1017. The overall system includes a body-worn camera 1017 in communication with the imaging and detection system 1019 via communication module 1018. In an embodiment, imaging and detection system 1019 can be replaced with an electromagnetic scanning system such as a radar system with sufficient resolution to determine whether an impermissible object exists on a suspect, in a form factor (i.e., small enough) so that the that scanning system allows for coupling with the body-worn camera in a practical way. In an embodiment, body-worn camera 1017 and imaging and detection system 1019 are contained in a single housing. In an embodiment, body-worn camera 1017 and imaging and detection system 1019 are contained in separate housings but in communication with each other by a wired communication connection. The wire that provides the wired communication can be detachable from body-worn camera 1017, imaging and detection system 1019, or both. In an embodiment, body-worn camera 1017 and imaging and detection system 1019 are contained in separate housings but in communication with each other by a wireless communication connection.

In an embodiment, the radar system 1001 is included in a housing distinct from the housing that contains body-worn camera 1017. The housing that contains body-worn camera 1017 can include the core processing system to provide digital processing to the data received from radar system 1001. In an embodiment, the housing that contains body-worn camera 1017 can include a combination of core processing system 1002, systems and communications 1005, camera 1012, display panel 1014, and user controls 1010.

In an embodiment, the apparatus further includes User Controls 1010. User Controls 1010 include user buttons 1011 to manipulate the apparatus to turn the device on and off, to set the resolution, configure the device, or select a preconfigured setting, initiate a scan, initiate a connection with the cloud-based service via one of the network interface (e.g., Wi-Fi, cellular, Bluetooth, or any other practicable interface) and control the camera functions. LEDs 1015 can be used to provide feedback and information to the user about the state of the device, or about the results of a scan.

In an embodiment, processor 1003 includes logic that is programmable by the user to determine whether a subject is carrying an impermissible object. In an embodiment, processor 1003 includes logic to send instructions to send the results of a scan to a central processing system to determine whether a subject is carrying an impermissible object, and if so, to receive information sufficient to provide the user with that information. In an embodiment, the device can be programmed, in the event the scan does not detect a weapon, to alert the user that no weapon is present. In an embodiment, the device can be programmed, in the event the scan does, indeed, detect an impermissible device, to alert the user.

Figure 11:
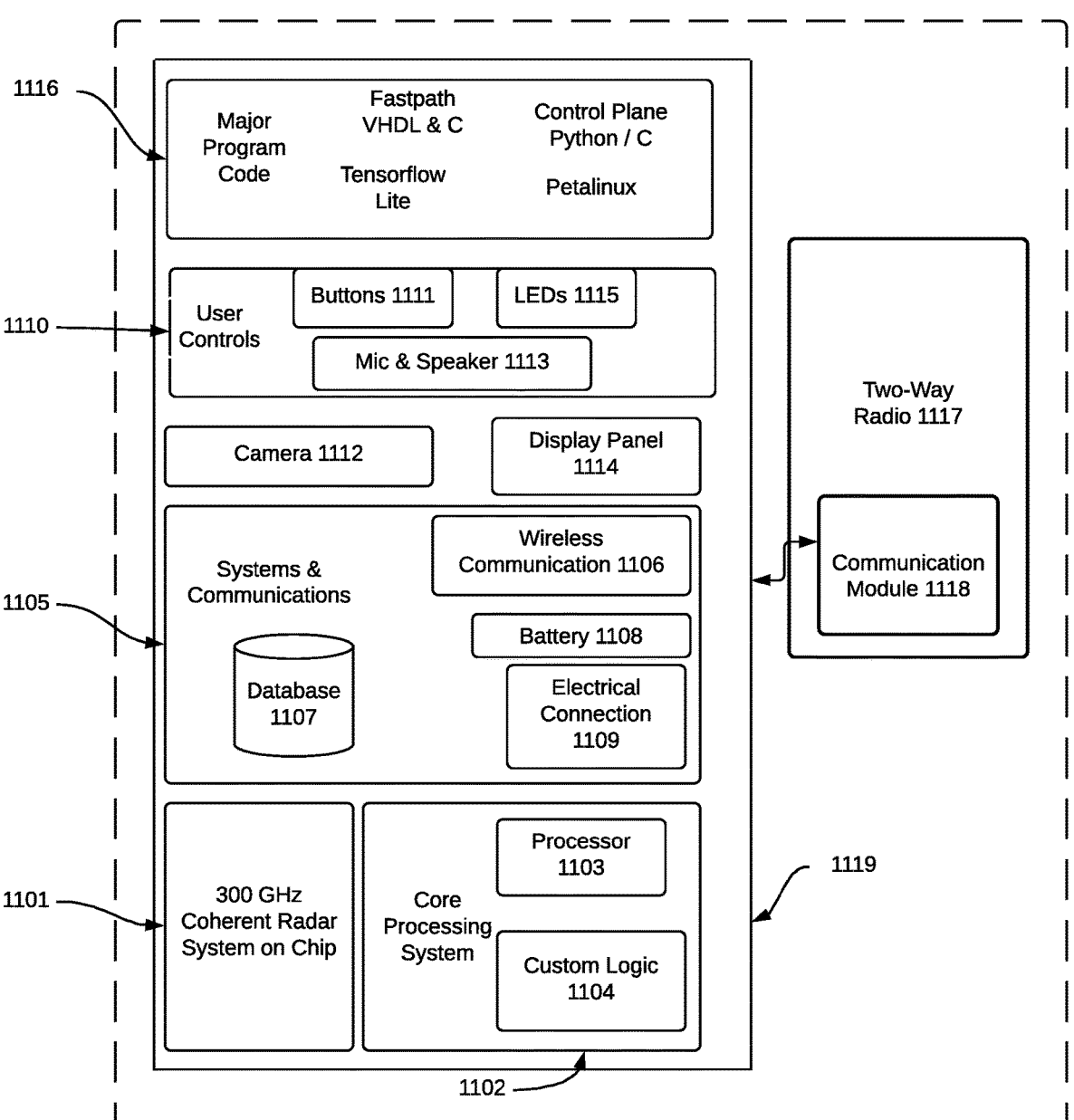
FIG. 11 is a block diagram of a system for providing a system for noninvasive imaging and detection in conjunction with a two-way radio.

FIG. 11 is a block diagram of a system for providing a system for noninvasive imaging and detection in conjunction with a two-way radio. For the purposes of the present invention, a two-way radio can include a walkie-talkie, or any type of two-way radio that can be handheld, have an earpiece, or be body worn, including the type of two-way radio typically used by law enforcement.

In an embodiment, two-way radio 1117 is coupled with radar system 1119. In an embodiment, the imaging and detection portion of the system includes a radar system that operates at a frequency to provide sufficient resolution such that the results of the scan can be used to determine whether a target is carrying a concealed impermissible object. In an embodiment, the imaging and detection portion of the system 1119 includes coherent radar system on a chip 1101, core processing the system 1102, systems and communications components 1105 (which can include database 1107, wireless communication circuitry 1106, battery 1108, and electrical connection 1109), a camera 1112, a display panel 1114, user controls 1110, and major program code 1116.

In an embodiment, the system includes circuitry to place the radar system in communication with the personal device. Such communication can be via a physical electrical connection or a wireless connection such as Wi-Fi, Bluetooth, or any other practicable wireless protocol.

The overall system includes a two-way radio 1117 in communication with the imaging and detection system 1119 via communication module 1118. In an embodiment, imaging and detection system 1119 can be replaced with an electromagnetic scanning system such as a radar system with sufficient resolution to determine whether an impermissible object exists on a suspect, in a form factor (i.e., small enough) so that the that scanning system allows for coupling with the body-worn camera in a practical way. In an embodiment, two-way radio 1117 and imaging and detection system 1119 are contained within a single housing. In an embodiment, two-way radio 1117 and imaging and detection system 1119 are contained in separate housings but in communication with each other by a wired communication connection. The wire that provides the wired communication can be detachable from the two-way radio 1117, imaging and detection system 1119, or both. In an embodiment, two-way radio 1117 and imaging and detection system 1119 are contained in separate housings but in communication with each other by a wireless communication connection.

In an embodiment, the radar system 1101 is included in a housing distinct from the housing that contains two-way radio 1117. The housing that contains two-way radio 1117 can include the core processing system to provide digital processing to the data received from radar system 1101. In an embodiment, the housing that contains two-way radio 1117 can include a combination of core processing system 1102, systems and communications 1105, camera 1112, display panel 1114, and user controls 1110.

In an embodiment, the apparatus further includes User Controls 1110. User Controls 1110 include user buttons 1111 to manipulate the apparatus to turn the device on and off, to set the resolution, configure the device, or select a preconfigured setting, initiate a scan, initiate a connection with the cloud-based service via one of the network interface (e.g., Wi-Fi, cellular, Bluetooth, or any other practicable interface) and control the camera functions. LEDs 1115 can be used to provide feedback and information to the user about the state of the device, or about the results of a scan.

In an embodiment, processor 1103 includes logic that is programmable by the user to determine whether a subject is carrying an impermissible object. In an embodiment, processor 1103 includes logic to send a signal via two-way radio 1117 to a user or to others that an impermissible object has (or has not) been found. In an embodiment, processor 1103 is configured to send instructions to send the results of a scan to a central processing system to determine whether a subject is carrying an impermissible object, and if so, to receive information sufficient to provide the user with that information. In an embodiment, the device can be programmed, in the event the scan does not detect a weapon, to alert the user that no weapon is present. In an embodiment, the device can be programmed, in the event the scan does, indeed, detect an impermissible device, to alert the user.

In an embodiment, the personal device coupled to the radar system can be a helmet, clothing, body armor, or a riot shield.

For the purposes of the present invention, the term electromagnetic scanning system, electromagnetic scanner, and the like, are used interchangeably with the term "radar."

One skilled in the art will understand, in the context of embodiments of the invention, that the term "a combination of" includes zero, one, or more, of each item in the list of items to be combined.

For the purposes of the present invention, the term computer program or computer code includes software, firmware, middleware, and any code in any computer language in any configuration, including any set of instructions or data intended for, and ultimately understandable by, a computing device.

One skilled in the art will understand that the order of elements described in each figure is given by way of example only. In an embodiment, the order of elements performed can be changed in any practicable way.

In some embodiments, the processes herein, or any portion or combination thereof, can be implemented as software modules. In other embodiments, the processes herein or any portion or combination thereof, can be implemented as hardware modules. In yet other embodiments, the embodiments herein, or any portion or combination thereof, can be implemented as a combination of hardware modules, software modules, firmware modules, or any form of program code.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps.

Additionally, steps may be performed in any suitable order. As used in this document, "each" refers to each member of a set or each member of a subset of a set.

We claim:

1. A system comprising:
   a housing containing a portable radar system configured to detect, when in use, the existence of an object concealed by clothing, the portable radar system including a coherent radar on a single chip, the coherent radar comprising a transmitter, the transmitter including:
   a ramp generator electrically coupled to, and configured to provide a voltage signal to, a wide band voltage controlled oscillator;
   a directional coupler electrically coupled to the wide band voltage controlled oscillator; and
   a phased-array antenna electrically coupled to the directional coupler and configured to transmit high-frequency signals in a range of operation between 0.1 and 1 terahertz with a center frequency exceeding approximately 200GHz;
   the portable radar system configured to, when in operation, emit a radar beam and to receive a reflection of the emitted radar beam.

2. The system of claim 1, further comprising a personal device that is at least one of a handheld device or a worn device, wherein the housing is configured to be mounted in contact with the personal device.

3. The system of claim 2, wherein the housing further contains circuitry to determine whether the object is an impermissible object; and
   circuitry to place the system in standby mode.

4. The system of claim 3, wherein the personal device comprises one of a firearm, a two-way radio, clothing, or a body worn camera.

5. The system of claim 4, wherein the portable radar system includes processing components configured to process instructions to perform at least one of the following set of functions: alert a user to the detection of an object, alert the user to the result of a match between a detected object and an object stored in a database, render an image, display an image, initiate a scan, or process the results of the scan.

6. The system of claim 5, further comprising a display panel in communication with the circuitry and configured to display at least one of text or image representing the results of the scan.

7. The system of claim 3, wherein the personal device includes a firearm, and the housing includes a radar coupling portion configured to couple to a firearm mount such that the radar system is oriented to scan a person in the direction that the firearm barrel is pointed.

8. The system of claim 3, wherein the circuitry is a first circuitry, and further comprising a second circuitry to facilitate communication between the personal device and the portable radar system.

9. A system comprising:
  a housing containing a portable radar system on a chip, the portable radar system on a chip configured to detect, when in use, the existence of a device concealed by clothing, and further configured to provide, when in use, sub millimeter lateral resolution, the portable radar system on a chip comprising a transmitter, the transmitter including:
    a ramp generator electrically coupled to, and configured to provide a voltage signal to, a wide band voltage controlled oscillator;
    a directional coupler electrically coupled to the wide band voltage controlled oscillator; and
  a phased-array antenna electrically coupled to the directional coupler and configured to transmit high-frequency signals in a range of operation between approximately 0.1 terahertz and 1 terahertz;
  the housing configured to be mounted in contact with a personal device.

10. The system of claim 9, wherein the personal device includes one of a firearm, a two-way radio, clothing, or a body worn camera.

11. The system of claim 10, wherein the portable radar system -on a chip includes processing components configured to process instructions to perform at least one of the following set of functions: alert a user to the detection of an object, alert the user to the result of a match between a detected object and an object stored in a database, render an image, display an image, initiate a scan, or process the results of the scan.

12. The system of claim 11, wherein the housing includes within it the portable radar system and also the personal device.

13. The system of claim 11, wherein the personal device is contained in a first housing, and the portable radar system is contained within a second housing that is not the first housing, and that is configured to be rigidly connected to the first housing.

14. The system of claim 13, where the second housing is configured to be detachable from the first housing.

15. The system of claim 11, where the portable radar system is configured to be operated as a standalone device independent of the personal device.

16. The system of claim 11, where the personal device and the portable radar system include circuitry to communicate with each other.

17. A system comprising:
  a housing containing a portable radar system on a chip, the portable radar system on a chip configured to detect, when in use, the existence of a device concealed by clothing, the portable radar system on a chip comprising a transmitter, the transmitter including:
  a ramp generator electrically coupled to, and configured to provide a voltage signal to, a wide band voltage controlled oscillator;
  a directional coupler electrically coupled to the wide band voltage controlled oscillator; and
  a phased-array antenna electrically coupled to the directional coupler and configured to transmit high-frequency signals in a range of operation between approximately.1 terahertz and 1 terahertz;
  the housing including circuitry to determine, based on the results of the scan, if an impermissible object is present on the person;
  the circuitry further configured to alert a user when an impermissible object is present on the person, wherein the housing is configured to be mounted via firearm mount.

18. The system of claim 17, further comprising a control panel to control the use of the portable radar system on a chip.

* * * * *